US012795648B2

(12) United States Patent
Lu et al.

(10) Patent No.: US 12,795,648 B2
(45) Date of Patent: Nov. 10, 2026

(54) RESOURCE INDICATION METHOD, NODE AND STORAGE MEDIUM

(71) Applicant: ZTE CORPORATION, Shenzhen (CN)

(72) Inventors: Youxiong Lu, Shenzhen (CN); Weimin Xing, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 273 days.

(21) Appl. No.: 18/702,612

(22) PCT Filed: Nov. 24, 2022

(86) PCT No.: PCT/CN2022/133897
§ 371 (c)(1),
(2) Date: Apr. 18, 2024

(87) PCT Pub. No.: WO2023/066411
PCT Pub. Date: Apr. 27, 2023

(65) Prior Publication Data

US 2024/0414705 A1 Dec. 12, 2024

(30) Foreign Application Priority Data

Oct. 21, 2021 (CN) .......................... 202111229119.2

(51) Int. Cl.
*H04W 72/1263* (2023.01)
*H04W 72/52* (2023.01)
*H04W 72/566* (2023.01)

(52) U.S. Cl.
CPC ....... *H04W 72/1263* (2013.01); *H04W 72/52* (2023.01); *H04W 72/566* (2023.01)

(58) Field of Classification Search
CPC H04W 72/1263; H04W 72/566; H04W 72/52
See application file for complete search history.

(56) References Cited

U.S. PATENT DOCUMENTS

2016/0278120 A1* 9/2016 Ro .................... H04W 74/0808
2017/0367004 A1* 12/2017 Yoon ................ H04W 28/0289
(Continued)

FOREIGN PATENT DOCUMENTS

CN 111246426 A 6/2020
CN 111934835 A 11/2020
CN 112398554 A 2/2021

OTHER PUBLICATIONS

International Search Report in Application No. PCT/CN2022/133897, dated Jan. 28, 2023, 4 pages, including translation.

*Primary Examiner* — Michael Thier
*Assistant Examiner* — Nevena Zecevic Sandhu
(74) *Attorney, Agent, or Firm* — Morgan, Lewis & Bockius LLP

(57) ABSTRACT

Provided are a resource indication method, a node and a storage medium. The resource indication method includes: receiving, by a first communication node, resource usage information, where the resource usage information includes resource position information of at least one transmission opportunity and a resource assignment order (RAO) or a set of to-be-used resources; and determining, by the first communication node, availability of a transmission opportunity according to the resource usage information.

18 Claims, 5 Drawing Sheets

(56) References Cited

U.S. PATENT DOCUMENTS

| | | | | |
|---|---|---|---|---|
| 2020/0154446 | A1* | 5/2020 | Yerramalli | H04W 72/23 |
| 2021/0105789 | A1 | 4/2021 | Freda et al. | |
| 2022/0060944 | A1* | 2/2022 | Sun | H04W 72/56 |
| 2022/0400490 | A1* | 12/2022 | Ji | H04W 72/23 |
| 2023/0131862 | A1* | 4/2023 | Xue | H04W 28/0273<br>370/329 |
| 2024/0073966 | A1* | 2/2024 | Patil | H04W 74/06 |
| 2024/0292462 | A1* | 8/2024 | Wang | H04W 74/0808 |

* cited by examiner

RESOURCE INDICATION METHOD, NODE AND STORAGE MEDIUM

CROSS-REFERENCE TO RELATED APPLICATIONS

This is a National Stage Application, filed under 35 U.S.C. 371, of International Patent Application No. PCT/CN2022/133897, filed on Nov. 24, 2022, which claims priority to Chinese Patent Application No. 202111229119.2, filed with the China National Intellectual Property Administration (CNIPA) on Oct. 21, 2021, the disclosures of which are incorporated herein by reference in their entireties.

TECHNICAL FIELD

The present application relates to the technical field of wireless communications, for example, a resource indication method, a node and a storage medium.

BACKGROUND

In the vehicle wireless communication technology (also referred to as vehicle-to-everything (V2X) communication), sidelink communication and the direct communication between user equipments (UEs) (also referred to as device-to-device (D2D) communication), resource allocation is performed in two modes: mode one and mode two. In mode one, resources are allocated through scheduling of a base station. In mode two, resources are autonomously selected by UEs. In mode one, after the scheduling of the central node such as the base station, resources between the UEs can be conflict-free. In mode two, due to the lack of the scheduling of the central node, the UEs need to prevent a resource conflict as much as possible when sharing resources according to a specified rule. In long-term evolution (LTE) V2X and new radio (NR) V2X, according to transmission characteristics of periodic services on a licensed carrier or in an intelligent transform system (ITS), a UE in mode two may acquire resource usage information of the UE in the following period by receiving sidelink control information (SCI) sent by another UE, so as to avoid, during resource selection, a resource that has been reserved by another UE, thereby implementing resource multiplexing between multiple UEs. A UE in mode one may expect that a resource indicated by the base station does not conflict with a resource used by another UE and cannot share the same resource with another UE. However, for a transmission opportunity obtained through contention, such as an unlicensed carrier, as for how to implement the resource multiplexing between multiple UEs and reduce a resource conflict between UEs within a channel occupancy time (COT) obtained through Listen Before Talk (LBT), the method defined in NR V2X is no longer applicable.

In the resource selection mode of mode two, when sharing a resource pool or a carrier or a bandwidth part (BWP) or a channel, the UE needs to obtain an available resource or a set of available resources through sensing. In NR V2X, for periodic services and aperiodic services, a physical sidelink control channel (PSCCH) from another sending UE may be sensed so that an indicated resource position and retransmission resource position in the next period are obtained, so as to select another unused resource and avoid a resource conflict between the selected resource and a resource used by another UE. However, for a shared spectrum, when the UE obtains a transmission opportunity through contention, there is no effective scheme to the problem of how the UE can prevent the resource conflict between UEs as much as possible when sharing the COT with another UE.

SUMMARY

A primary object of embodiments of the present application is to provide a resource indication method, a node and a storage medium, so as to enable a communication node to determine availability of a transmission opportunity based on received resource usage information to avoid a conflict with a resource used by another communication node.

An embodiment of the present application provides a resource indication method. The method includes the following:

A first communication node receives resource usage information.

The resource usage information includes resource position information of at least one transmission opportunity and a resource assignment order (RAO) or a set of to-be-used resources.

The first communication node determines availability of a transmission opportunity according to the resource usage information.

An embodiment of the present application provides a resource indication method. The method includes the following:

A second communication node uses at least one resource acquired as a transmission opportunity.

The second communication node senses SCI sent by another communication node.

The second communication node determines availability of the transmission opportunity according to the SCI.

An embodiment of the present application provides a resource indication method. The method includes the following:

A third communication node sends resource usage information to a first communication node.

The resource usage information includes at least one transmission opportunity and an RAO and is used for instructing the first communication node to determine availability of a transmission opportunity of the at least one transmission opportunity.

An embodiment of the present application provides a resource indication apparatus. The apparatus includes a communication module and a determination module.

The communication module is configured to receive resource usage information.

The resource usage information includes resource position information of at least one transmission opportunity and an RAO or a set of to-be-used resources.

The determination module is configured to determine availability of a transmission opportunity according to the resource usage information.

An embodiment of the present application provides a resource indication apparatus. The apparatus includes a determination module and a sensing module.

The determination module is configured to use at least one resource acquired as a transmission opportunity.

The sensing module is configured to sense SCI sent by another communication node.

The determination module is configured to determine availability of the transmission opportunity according to the SCI.

An embodiment of the present application provides a resource indication apparatus. The apparatus includes a communication module.

The communication module is configured to send resource usage information to a first communication node.

The resource usage information includes at least one transmission opportunity and an RAO and is used for instructing the first communication node to determine availability of a transmission opportunity of the at least one transmission opportunity.

An embodiment of the present application provides a communication node including a processor, and the processor performs the resource indication method according to any embodiment of the present application when executing a computer program.

An embodiment of the present application provides a read-write storage medium, which is configured to store a computer program which, when executed by a processor, causes the processor to perform the resource indication method according to any embodiment of the present application.

The embodiments of the present application provide the resource indication method, the node and the storage medium. The method includes the following: the first communication node receives the resource usage information, where the resource usage information includes the resource position information of the at least one transmission opportunity and the RAO of the at least one transmission opportunity or the set of to-be-used resources; and the first communication node determines the availability of the transmission opportunity according to the resource usage information. Based on the preceding schemes, a conflict between resources used by a communication node and another communication node can be avoided.

DETAILED DESCRIPTION

Embodiments of the present application are described hereinafter in conjunction with the drawings.

Additionally, in the embodiments of the present application, words such as "optionally" or "for example" are used for indicating examples, illustration or description. Any embodiment or design described as "optional" or "example" in the embodiments of the present application is not to be construed as being more preferred or advantageous than other embodiments or designs. Rather, the words such as "optionally" or "for example" are intended to present related concepts in specific manners.

Figure 1:
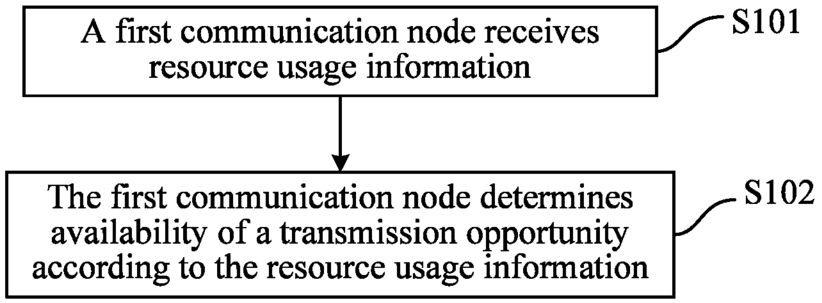
FIG. 1 is a flowchart of a resource indication method according to an embodiment of the present application.

FIG. 1 is a flowchart of a resource indication method according to an embodiment of the present application. The method may be performed by a first communication node, where availability of a transmission opportunity is determined based on resource usage information received by the first communication node to avoid a conflict with a resource used by another communication node. As shown in FIG. 1, the method may include S101 and S102.

In S101, the first communication node receives the resource usage information.

In the embodiments of the present application, the first communication node may be a UE, a handheld terminal or the like. The resource usage information received by the first communication node may include resource position information of at least one transmission opportunity and an RAO, or the resource usage information may include a set of to-be-used resources.

In S102, the first communication node determines the availability of the transmission opportunity according to the resource usage information.

The first communication node determines the availability of the transmission opportunity according to the received resource usage information and thus can determine an available transmission opportunity or an unavailable transmission opportunity of the first communication node, so as to avoid the conflict with the resource used by another communication node.

For example, in the case where the resource usage information includes the resource position information of the at least one transmission opportunity and the RAO of the at least one transmission opportunity, S102 may be implemented in the following manner: the first communication node selects, from the at least one transmission opportunity, a transmission opportunity corresponding to the RAO and determines whether availability of the selected transmission opportunity is available or unavailable.

In an example, the RAO may include at least one of the following:

All transmission opportunities have the same order, and one order value indicates all the transmission opportunities; a set of transmission opportunities for initial transmission and each set of transmission opportunities for retransmission correspond to their respective order values; different transmission opportunities correspond to their respective order values; order values of multiple transmission opportunities in chronological order are arranged in ascending order, where an initial value of the order values is 0 or an indication value X, and X is an integer greater than or equal to 0; order values of multiple transmission opportunities in chronological order are arranged in descending order, where an initial value of the order values is N or an indication value Y, and N and Y are each an integer greater than 0; or the smaller a value of the RAO, the higher a priority.

In an example, the preceding RAO includes one of the following:

In the case where an order value range of the RAO is less than 2, an order value of 0 indicates that the current transmission opportunity is available as long as the current transmission opportunity satisfies a channel usage condition, and an order value of 1 indicates that a condition for the current transmission opportunity to be available includes at least that the first communication node senses that another communication node releases a resource corresponding to the current transmission opportunity. In the case where an order value range of the RAO is greater than 1, an order value of 0 indicates that the current transmission opportunity is available as long as the current transmission opportunity satisfies a channel usage condition, and an order value of k indicates that a condition for the current transmission opportunity to be available includes at least that the first communication node senses that another communication node corresponding to an order value of k−1 releases a resource corresponding to the current transmission opportunity, where k is an integer greater than 0.

In the case where the resource usage information includes the set of to-be-used resources, S102 may be implemented in the following manner: the first communication node senses a channel, acquires a sensing result, and determines availability of a transmission opportunity in the set of to-be-used resources according to the sensing result.

For example, that the first communication node senses the channel may include the three cases below.

1. The first communication node succeeds in LBT before one selected transmission opportunity, that is, the sensing result of the channel is idle.

2. The first communication node performs sending before one selected transmission opportunity, and the current transmission opportunity is within the remaining COT.

3. Before one selected transmission opportunity, the first communication node senses COT information shared by another communication node, and a COT usage condition is satisfied.

In an embodiment, that the first communication node determines the availability of the transmission opportunity in the set of to-be-used resources according to the sensing result may include at least one of the following:

In the case where the sensing result satisfies a first condition, the first communication node determines that the transmission opportunity is available. In the case where the sensing result does not satisfy a first condition, the first communication node determines that the transmission opportunity is unavailable.

Figure 2:
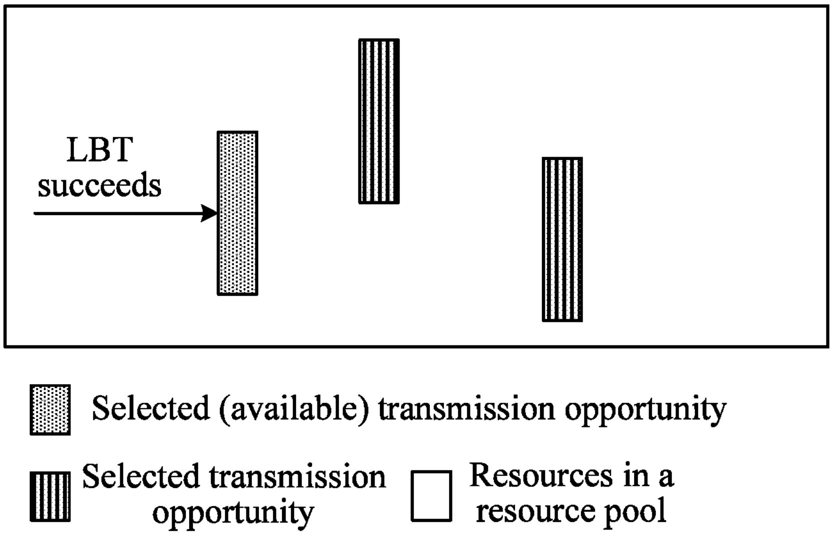
FIG. 2 is a schematic diagram illustrating that availability of a transmission opportunity is determined based on a sensing result in a case of three transmission opportunities according to an embodiment of the present application.

The first condition may be a channel sensing condition. For example, the first condition may include the following: if the LBT of the first communication node succeeds before any one transmission opportunity determined, that is, the sensing result of the channel is idle, the one transmission opportunity is available. As shown in FIG. 2, assuming that the first communication node acquires three transmission opportunities and the first communication node performs channel sensing of Type 1 before the first transmission opportunity, if the sensed channel is idle, that is, the LBT succeeds, the first transmission opportunity is available, and the first communication node sends a communication signal or channel on a resource corresponding to the first transmission opportunity. If the sensed channel is busy, that is, the LBT fails, the resource corresponding to the first transmission opportunity fails, and the first communication node sends no communication signal or channel.

Figure 3:
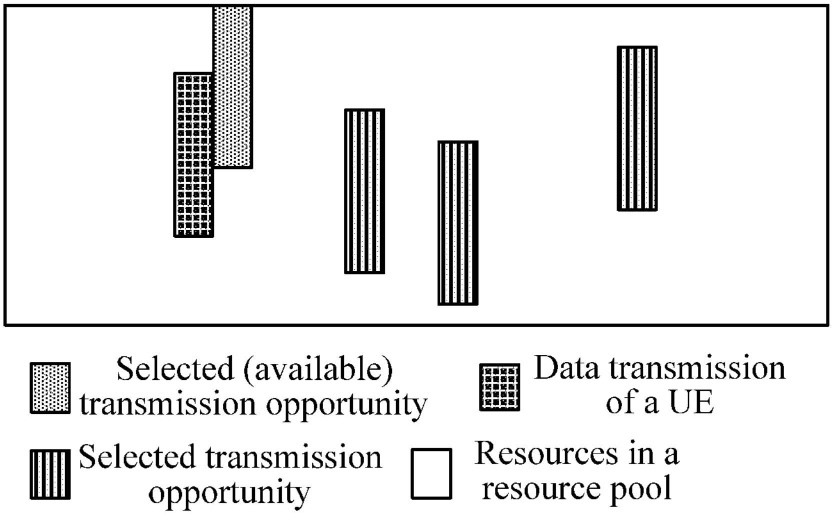
FIG. 3 is a schematic diagram illustrating that availability of a transmission opportunity is determined in a case of four transmission opportunities according to an embodiment of the present application.

Alternatively, the first communication node transmits data before any one transmission opportunity determined, if the transmission opportunity for transmitting data is within the remaining COT, and a time interval between the one transmission opportunity determined and the transmission opportunity for transmitting the data is less than a threshold, the one transmission opportunity is available. As shown in FIG. 3, assuming that the first communication node obtains four selected transmission opportunities for communication and the first communication node sends other data before the first selected transmission opportunity, if the first selected transmission opportunity and the previous transmission are in the same remaining COT and an interval between the first selected transmission opportunity and the previous transmission is less than a time interval threshold, the first selected transmission opportunity is available, and the first communication node may send communication data on the resource corresponding to the current transmission opportunity.

Figure 4:
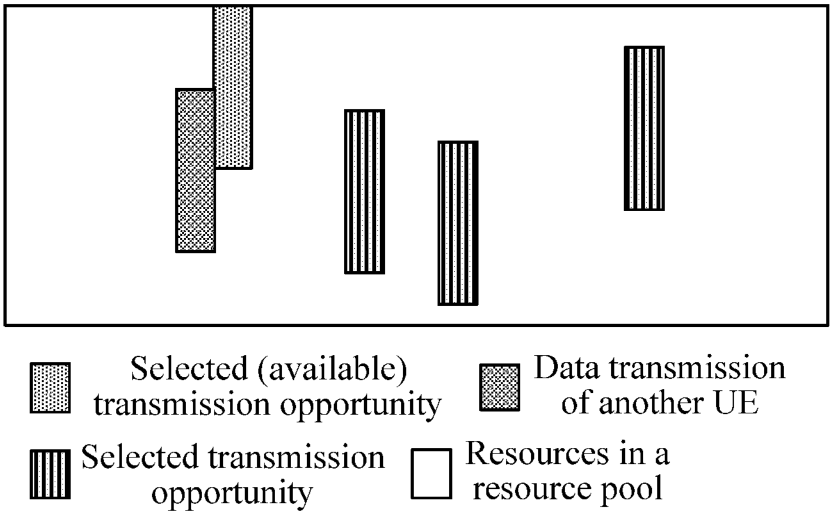
FIG. 4 is another schematic diagram illustrating that availability of a transmission opportunity is determined in a case of four transmission opportunities according to an embodiment of the present application.

Alternatively, before any one transmission opportunity determined, the first communication node senses COT information sent by another communication node, if the COT information satisfies the usage condition, the one transmission opportunity determined is adjacent to a transmission slot where the COT information is sensed, and a time interval between the one transmission opportunity determined and the transmission slot is less than a threshold, the one transmission opportunity is available. As shown in FIG. 4, if the first communication node obtains four selected transmission opportunities for communication, the first communication node senses a transmission control message and data sent by another communication node before the first selected transmission opportunity, measured energy (for example, reference signal received power (RSRP) or a received signal strength indication (RSSI) of a physical sidelink control channel (PSCCH)/physical sidelink shared channel (PSSCH)) is greater than a threshold, and an interval between the first selected transmission opportunity and the previous transmission is less than a time interval threshold, the first selected transmission opportunity is available.

Alternatively, as shown in FIG. 4, if the first communication node senses a transmission control message and data sent by another communication node, before the first selected transmission opportunity, measured energy (for example, RSRP or an RSSI of a PSCCH/PSSCH) is greater than a threshold, the first selected transmission opportunity and the previous transmission are in the same remaining COT, an interval between the first selected transmission opportunity and the previous transmission is less than a time interval threshold, and additionally, a priority (for example, a ProSe per packet priority (PPPP) or a channel access priority class (CAPC)) satisfies a threshold for COT sharing, for example, the priority is greater than or equal to a priority indicated by the other communication node for COT sharing, that is, a priority value is less than an indicated priority value (the higher the priority, the smaller the priority value), the first selected transmission opportunity is available.

The preceding time interval threshold may be 25 us, 16 us, configured and indicated by a base station or determined according to a type of sensing of the first communication node, where the type of sensing includes Type 1, Type 2A, Type 2B, Type 2C, and the like.

In an embodiment, the preceding usage condition may include that strength of a notification signal sent by another communication node is greater than a strength threshold; or that a channel priority is not lower than a channel priority indicated by another communication node indicating the COT sharing; or that strength of a notification signal sent by another communication node is greater than a strength threshold and a channel priority is not lower than a channel priority indicated by the other communication node indicating the COT sharing.

In an embodiment, if the first communication node performs channel sensing before N symbols previous to a selected transmission opportunity and the sensed channel is idle, that is, the LBT succeeds, it is determined that the selected transmission opportunity is available, the communication data is sent on the resource corresponding to the current transmission opportunity, and a notification signal is sent on a notification signal resource before the current transmission opportunity.

Figure 5:
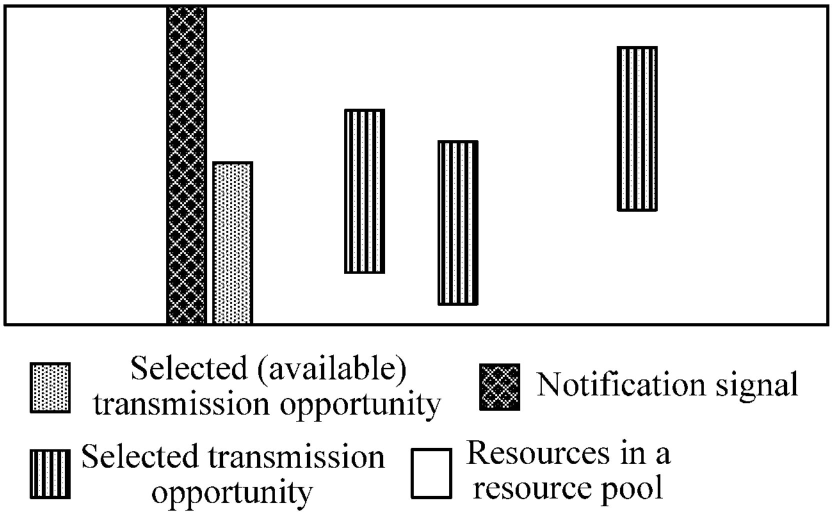
FIG. 5 is a schematic diagram illustrating that a first communication node sends a notification signal before a transmission opportunity according to an embodiment of the present application.

As shown in FIG. 5, before actual transmission, the first communication node may send the notification signal to another communication node to notify that a transmission opportunity in the next slot is available, and the first communication node sends SCI on the selected available transmission opportunity, where an indicated COT is a value obtained according to the priority (for example, the PPPP or the CAPC) or the number of slots.

Figure 6:
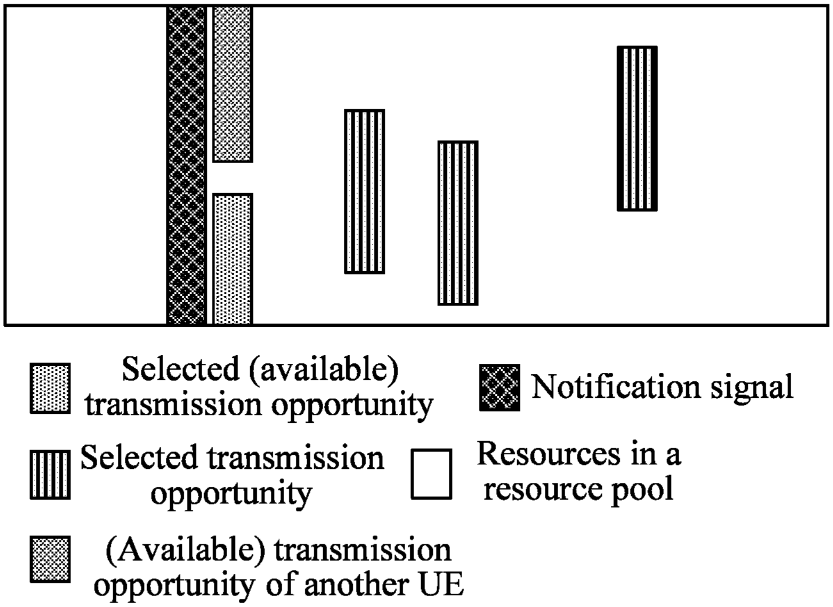
FIG. 6 is a schematic diagram illustrating that another communication node determines availability of a transmission opportunity based on a sensed notification signal according to an embodiment of the present application.

Accordingly, as shown in FIG. 6, if another communication node successfully senses the notification signal before a selected transmission opportunity, and strength of the notification signal is greater than or equal to the threshold, which indicates that the selected transmission opportunity in an adjacent slot after the notification signal is available, the another communication node sends a control message (for example, SCI) and data on the selected available transmission opportunity, and an indicated COT is 0 or a reserved value.

In an example, the first communication node may instruct a physical layer to perform sensing based on higher-layer signaling of the first communication node and obtain, according to a sensing rule (such as a similar sensing process defined in LTE and NR), a set of idle resources which are in one COT and satisfy a delay requirement. One or more resources are selected from the set of idle resources and used as the selected transmission opportunity, which, for example, are randomly selected or selected at a probability corresponding to the priority. The COT refers to one COT obtained by the first communication node after the LBT succeeds, a COT indicated in a control message of another communication node sensed by the first communication node or a COT obtained by the first communication node by sensing the notification signal.

In the case where the first communication node determines that the transmission opportunity is unavailable, the first communication node sends indication signaling indicating that the current transmission opportunity is unavailable. For example, the first communication node sends the indication signaling in at least one of the manners below.

Higher-layer signaling is sent, where the higher-layer signaling indicates that the current transmission opportunity is unavailable and triggers resource reselection. The current transmission opportunity is discarded and higher-layer signaling is sent. The current transmission opportunity is discarded and indication information is sent to the base station.

In the embodiment of the present application, the transmission opportunity includes a transmission opportunity for the initial transmission and/or a transmission opportunity for retransmission.

In the case where the first communication node determines that the transmission opportunity is available, the first communication node may also send a sidelink communication signal on the available transmission opportunity. The sidelink communication signal is used for indicating a sidelink release order (SRO) or a sidelink assignment order (SAO) of a resource corresponding to a transmission opportunity other than the available transmission opportunity in the resource usage information. A larger assignment order of a resource indicated by the SRO indicates a lower usage priority of the resource. A larger release order of a resource indicated by the SRO indicates a larger allowed order (SAO) for using the resource.

The SRO or the SAO may be indicated in SCI in the sidelink communication signal.

For example, the SCI may indicate the SRO or the SAO in at least one of the manners below.

An indication is performed in an SAO field in the SCI. For example, the SAO field includes indication information of 2 bits, which may include 00, 01, 10 and 11. The first communication node uses a transmission opportunity with an RAO of 0, 00 may indicate that a communication node with an RAO of 1 may use a resource indicated in the SCI, 01 indicates that a communication node with an RAO of 2 may use the resource indicated in the SCI, 10 indicates that a communication node with an RAO of 3 may use the resource indicated in the SCI, and 11 indicates that a communication node with an RAO of 4 may use the resource indicated in the SCI.

An indication is performed in an SRO field in the SCI. For example, the SRO field includes indication information of 2 bits, which may include 00, 01, 10 and 11. 00 may indicate that the first communication node continues using the resource indicated in the SCI, 01 may indicate that the communication node with the RAO of 1 may use the resource indicated in the SCI, 10 may indicate that the communication node with the RAO of 2 may use the resource indicated in the SCI, and 11 indicates that the communication node with the RAO of 3 may use the resource indicated in the SCI.

A resource selection mode is indicated, where the resource selection mode implicitly indicates the SAO or the SRO. For example, it is indicated that the resource selection mode is mode one, that is, a mode of scheduling by the base station, which indicates that SAO=0 or SRO>0, and the resource indicated in the SCI needs to be released.

An indication is performed through a 1-bit identifier bit. For example, 1 indicates that SAO>0 or that the resource indicated in the SCI is released; and 0 indicates that a resource for continued use is reserved.

The SCI implicitly indicates that the SAO is 0 or that the SRO is 1. For example, if the RAO supports at most two order values, 0 and 1, a resource usage situation may be indicated through the SCI in an implicit manner. For example, the SCI indicates that some resource is a released resource or that the SAO corresponding to the resource is 0 or implicitly indicates that the SRO corresponding to the resource is 1.

An indication is performed based on a $2^{nd}$-stage SCI format. The $2^{nd}$-stage SCI format indicates that SAO>0, indicating that the resource indicated in the SCI is released.

In an example, the SAO is determined according to the RAO in the resource usage information, where a value of the SAO may be equal to the value of the RAO.

In an example, the SRO may also be determined according to the RAO in the resource usage information, where a value of the SRO may be equal to the value of the RAO plus 1.

The SAO may include at least one of the following:

In the case where an order value range of the RAO is less than 2 (that is, order<2, and two system levels are included), for an order value of 0, the SAO corresponding to the transmission opportunity indicated in the SCI is 0, that is, another communication node, for example, a communication node with the RAO of 1 may use the resource indicated in the SCI; and for an order value of 1, the SAO corresponding to the transmission opportunity indicated in the SCI is 1, that is, another communication node, for example, a communication node with the RAO of 2 may use the resource indicated in the SCI.

In the case where an order value range of the RAO is greater than 1 (that is, order>1, and multiple system levels are included), for an order value of 0, the SAO corresponding to the transmission opportunity indicated in the SCI is 0, that is, another communication node, for example, a communication node with the RAO of 1 may use the resource indicated in the SCI; and for an order value of k, the SAO corresponding to the transmission opportunity indicated in the SCI is k, that is, another communication node, for example, a communication node with an RAO of k+1 may use the resource indicated in the SCI, where k is an integer greater than 0.

The SRO may include at least one of the following:

In the case where an order value range of the RAO is less than 2 (that is, order<2, and two system levels are included), for an order value of 0, the SRO corresponding to the transmission opportunity indicated in the SCI is 0, that is, another communication node cannot use the resource indicated in the SCI; and for an order value of 1, the SRO corresponding to the transmission opportunity indicated in the SCI is 1, that is, another communication node, for example, a communication node with the RAO of 1 may use the resource indicated in the SCI.

In the case where an order value range of the RAO is greater than 1 (that is, order>1, and multiple system levels are included), for an order value of 0, the SRO corresponding to the transmission opportunity indicated in the SCI is 0, that is, another communication node cannot use the resource indicated in the SCI; and for an order value of k, the SRO corresponding to a transmission opportunity indicated in the SCI is k, that is, another communication node, for example, a communication node with an RAO of k may use the resource indicated in the SCI, where k is an integer greater than 0.

Figure 7:
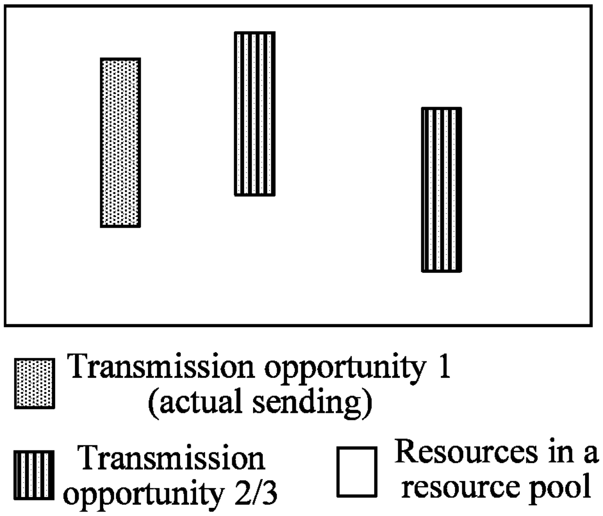
FIG. 7 is a schematic diagram illustrating that a first communication node sends SCI based on three resources according to an embodiment of the present application.

As shown in FIG. 7, assuming that the first communication node acquires three resources (that is, transmission opportunity 1, transmission opportunity 2 and transmission opportunity 3) shown in FIG. 7 and corresponding to an RAO of 0, and the first communication node satisfies the channel usage condition on transmission opportunity 1 and may perform transmission for sidelink communication, SCI is sent on a resource corresponding to transmission opportunity 1 to indicate a resource of transmission opportunity 2 and a resource of transmission opportunity 3 and also to indicate that an SRO corresponding to the resources of transmission opportunity 2 and transmission opportunity 3 is 1, or SCI is sent to indicate the resource of transmission opportunity 2 and the resource of transmission opportunity 3 and also to indicate that an SAO corresponding to the transmission opportunity 2 and the transmission opportunity 3 is 0.

Figure 8:
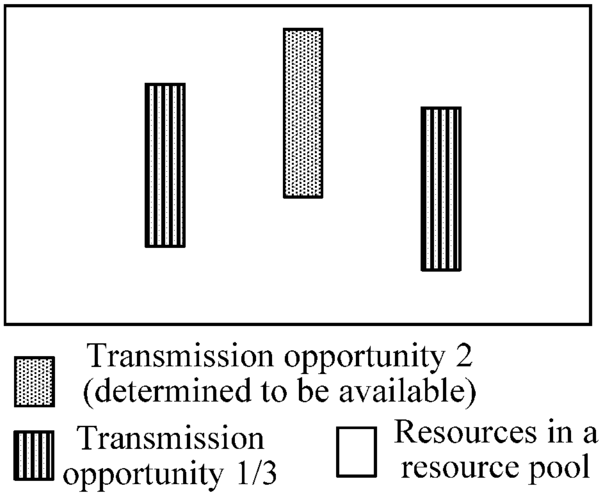
FIG. 8 is a schematic diagram illustrating that a second communication node senses SCI based on three resources according to an embodiment of the present application.

As shown in FIG. 8, it is assumed that a second communication node (which may be another communication node excluding the first communication node) acquires three resources shown in FIG. 8 and corresponding to an RAO of 1, where the three resources overlap the three resources shown in FIG. 7 and acquired by the first communication node. Before the first transmission opportunity, the second communication node has not sensed an indication of another communication node that the resource corresponding to transmission opportunity 1 is released, and thus the second communication node discards the first transmission opportunity. If the second communication node senses, before the second transmission opportunity, the SCI sent by the first communication node, and the SCI indicates the resource of transmission opportunity 2/3 and indicates that the SRO corresponding to the resource of transmission opportunity 2/3 is 1 or the SCI indicates the resource of transmission opportunity 2/3 and indicates that the SAO corresponding to the resource of transmission opportunity 2/3 is 0, the second communication node determines that the resources corresponding to transmission opportunity 2 and transmission opportunity 3 are available. If the channel usage condition is satisfied on the resource corresponding to transmission opportunity 2, the second communication node sends a sidelink communication signal on the resource corresponding to transmission opportunity 2 and sends SCI on the resource corresponding to transmission opportunity 2 to indicate the resource of transmission opportunity 3 and indicate that an SRO corresponding to the resource corresponding to transmission opportunity 3 is 2 or that an SAO corresponding to the resource corresponding to transmission opportunity 3 is 1.

Figure 9:
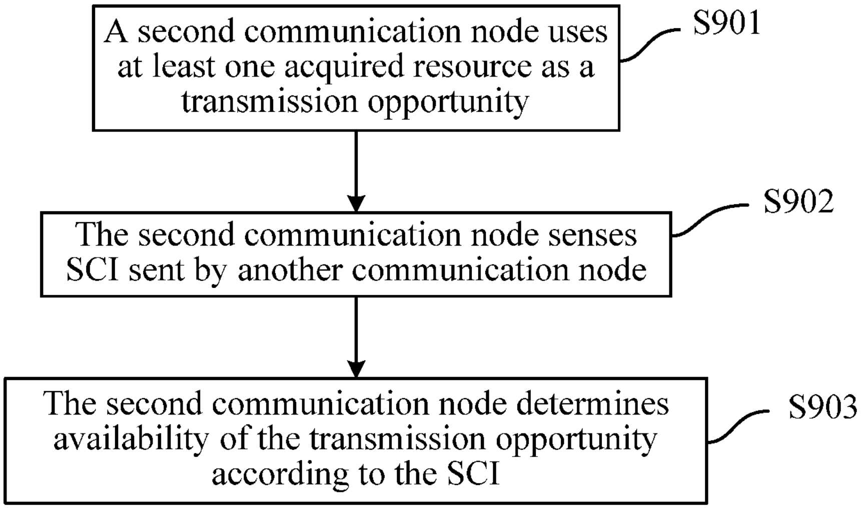
FIG. 9 is a flowchart of another resource indication method according to an embodiment of the present application.

FIG. 9 is a flowchart of another resource indication method according to an embodiment of the present application. The method may be performed by a second communication node and used for determining availability of an acquired transmission opportunity based on sensed SCI that is sent by another communication node, so as to avoid a conflict with a resource used by another communication node. As shown in FIG. 9, the method may include S901, S902 and S903.

In S901, the second communication node uses at least one resource acquired as the transmission opportunity.

In the embodiment of the present application, the second communication node may be the first communication node in the embodiment shown in FIGS. 1 to 8 or may be another communication node, that is, the communication node may perform both the method provided in the embodiment of FIG. 1 and the method provided in the embodiment of FIG. 9.

In S902, the second communication node senses the SCI sent by another communication node.

In the case where the second communication node is the other communication node in the embodiment of FIGS. 1 to 8, the other communication node in the present embodiment may be the first communication node in the embodiment of FIGS. 1 to 8. In the case where the second communication node is the first communication node in the embodiment of FIGS. 1 to 8, the other communication node in the present embodiment may be the other communication node in the embodiment of FIGS. 1 to 8.

For example, in the case where an RAO corresponding to the transmission opportunity obtained by the second communication node has the highest level (for example, RAO=0), the second communication node may directly use a resource corresponding to the transmission opportunity when satisfying a channel usage condition, that is, the SCI sent by the other communication node does not need to be sensed. In the case where the RAO corresponding to the transmission opportunity obtained by the second communication node has a level of k, the second communication node senses the SCI sent by the other communication node. If an indication that SAO=k−1 in the SCI is successfully sensed or an indication that SRO=k in the SCI is successfully sensed, it indicates that a resource corresponding to the transmission opportunity indicated in the SCI is released, and the second communication node may directly use the resource corresponding to the transmission opportunity when satisfying the channel usage condition.

The second communication node senses the SCI. For the SAO or the SRO indicated in the SCI, if RAO>SAO or RAO=SRO, it indicates that the second communication node is allowed to use the resource released by the communication node sending the SCI.

In S903, the second communication node determines the availability of the transmission opportunity according to the SCI.

In an embodiment, the second communication node may sense a channel and determine the availability of the transmission opportunity according to a sensing result of the channel. In the embodiment of the present application, the transmission opportunity may include a transmission opportunity for the initial transmission and/or a transmission opportunity for retransmission.

For example, determining the availability of the transmission opportunity in S903 may be implemented in at least one of the manners below.

In the case of determining that a second condition is satisfied, the second communication node determines that the transmission opportunity is available. In the case of determining that a second condition is not satisfied, the second communication node determines that the transmission opportunity is unavailable.

For example, the second condition may include at least one of the conditions below.

The second communication node satisfies the channel usage condition. For example, LBT of the second communication node succeeds before any one transmission opportunity determined. Alternatively, the second communication node transmits data before any one transmission opportunity determined, the transmission opportunity for transmitting the data is within the remaining COT, and a time interval between the one transmission opportunity determined and the transmission opportunity for transmitting the data is less than a threshold. Alternatively, before any one transmission opportunity determined, the second communication node senses COT information sent by another communication node, if the COT information satisfies a usage condition, the one transmission opportunity determined is adjacent to a transmission slot where the COT information is sensed, and a time interval between the one transmission opportunity determined and the transmission slot is less than a threshold.

The RAO corresponding to the transmission opportunity has the highest level. The RAO corresponding to the transmission opportunity has a level of k, and the second communication node succeeds in sensing that the SAO indicated in the SCI sent by the other communication node is k−1. The RAO corresponding to the transmission opportunity has a level of k, and the second communication node succeeds in sensing that the SRO indicated in the SCI sent by the other communication node is k.

If the second communication node determines that the transmission opportunity is available, the second communication node performs sidelink communication.

For example, that the second communication node performs the sidelink communication may include at least one of the following:

Communication information of a physical channel or a physical signal is sent on a resource corresponding to the current transmission opportunity. It is determined that the first available resource is an initial transmission resource, and it is determined that another available resource is a retransmission resource.

SCI is sent on the resource corresponding to the current transmission opportunity to indicate an SRO or an SAO.

The SCI may indicate the SRO or the SAO in at least one of the manners below.

An indication is performed in an SAO field in the SCI. An indication is performed in an SRO field in the SCI. A resource selection mode is indicated, where the resource selection mode implicitly indicates the SAO or the SRO. An indication is performed through a 1-bit identifier bit. The SCI implicitly indicates that the SAO is 0 or that the SRO is 1. For example, if the RAO supports at most two order values, 0 and 1, the SCI may indicate that some resource is a released resource or that the SAO corresponding to the resource is 0 or that the SRO corresponding to the resource is 1. An indication is performed based on a $2^{nd}$-stage SCI format.

If the second communication node determines that the transmission opportunity is unavailable, the second communication node sends indication information. For example, that the second communication node sends the indication information may include at least one of the following:

Higher-layer signaling is sent, where the higher-layer signaling indicates that the current transmission opportunity is unavailable and triggers resource reselection. The current transmission opportunity is discarded, and higher-layer signaling is sent. The current transmission opportunity is discarded, and indication information is sent to a third communication node.

As shown in FIG. 8, it is assumed that the second communication node acquires three resources shown in FIG. 8 as transmission opportunities and acquires an RAO of k corresponding to the transmission opportunities. The second communication node senses SCI sent by another communication node in the current resource pool. If the second communication node succeeds in sensing an indication that SAO=k−1 in the SCI or an indication that SRO=k in the SCI before the second transmission opportunity, and the resource indicated in the SCI includes a resource corresponding to transmission opportunity 2 and a resource corresponding to transmission opportunity 3, the second communication node determines that the resources corresponding to transmission opportunity 2 and transmission opportunity 3 are available. A success in sensing the SCI indicates a success in decoding the SCI, and also indicates that RSRP of a demodulation reference signal (DMRS) of a PSSCH or a PSCCH on the resource indicated in the SCI is greater than a threshold.

If the channel usage condition is satisfied on the resource corresponding to transmission opportunity 2, the second communication node performs sending for sidelink communication on the resource corresponding to transmission opportunity 2. In an embodiment, the second communication node sends the SCI on the resource corresponding to transmission opportunity 2 to indicate the resource of transmission opportunity 3 and indicate that an SRO corresponding to the resource corresponding to transmission opportunity 3 is k+1 or that an SAO corresponding to the resource corresponding to transmission opportunity 3 is k.

Figure 10:
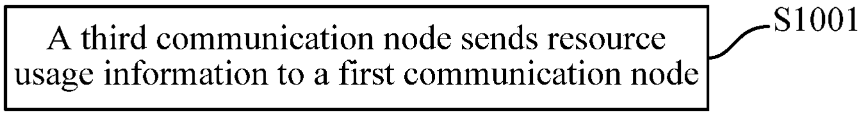
FIG. 10 is a flowchart of another resource indication method according to an embodiment of the present application.

FIG. 10 is a flowchart of another resource indication method according to an embodiment of the present application. The method may be performed by a third communication node and used for sending resource indication information to another communication node so that the other communication node determines availability of an acquired transmission opportunity based on the acquired resource indication information, so as to avoid a conflict between resources used by communication nodes. As shown in FIG. 10, the method may include S1001.

In S1001, the third communication node sends resource usage information to a first communication node.

In the embodiments of the present application, the third communication node may be a base station or a network node (for example, a roadside unit (RSU)), and the first communication node may be a UE, a handheld terminal or the like. The resource usage information sent by the third communication node includes at least one transmission opportunity and an RAO and is used for instructing the first communication node to determine the availability of the transmission opportunity.

For example, the RAO may include at least one of the following:

All transmission opportunities have the same order, and one order value indicates all the transmission opportunities; a set of transmission opportunities for initial transmission and each set of transmission opportunities for retransmission correspond to their respective order values; different transmission opportunities correspond to their respective order values; order values of multiple transmission opportunities in chronological order are arranged in ascending order, where an initial value of the order values is 0 or an indication value X, and X is an integer greater than or equal to 0; or order values of multiple transmission opportunities in chronological order are arranged in descending order, where an initial value of the order values is N or an indication value Y, and N and Y are each an integer greater than 0.

In an example, the RAO includes one of the following:

In the case where an order value range of the RAO is less than 2 (that is, order<2, and two system levels are included), an order value of 0 indicates that the current transmission opportunity is available as long as the current transmission opportunity satisfies a channel usage condition, and an order value of 1 indicates that a condition for the current transmission opportunity to be available includes at least that the first communication node senses that another communication node releases a resource corresponding to the current transmission opportunity. In the case where an order value range of the RAO is greater than 1 (that is, order>1, and multiple system levels are included), an order value of 0 indicates that the current transmission opportunity is available as long as the current transmission opportunity satisfies a channel usage condition, and an order value of k indicates that a condition for the current transmission opportunity to be available includes at least that the first communication node senses that another communication node corresponding to an order value of k−1 releases a resource corresponding to the current transmission opportunity, where k is an integer greater than 0.

The preceding RAO may be indicated in downlink control information (DCI) or indicated through a preconfiguration. For example, the DCI indicates one RAO value, and the RAO value corresponds to all transmission opportunities indicated in the DCI, that is, all the transmission opportunities indicated in the DCI have the same RAO value.

In an example, the DCI indicates two RAO values, the first RAO value corresponds to the set of transmission opportunities for initial transmission, and the second RAO value corresponds to the set of transmission opportunities for retransmission.

In another example, the DCI indicates three sets of transmission opportunities and correspondingly indicates three RAO values, the first RAO value corresponds to the first set of transmission opportunities, the second RAO value corresponds to the second set of transmission opportunities, and the third RAO value corresponds to the third set of transmission opportunities.

In another example, the DCI indicates three transmission opportunities, the first RAO value corresponds to the first transmission opportunity, the second RAO value corresponds to the second transmission opportunity, and the third RAO value corresponds to the third transmission opportunity.

In another example, the DCI indicates three transmission opportunities, and order values of multiple transmission opportunities in chronological order are increased by 1 in sequence (that is, in ascending order). The first transmission opportunity has an RAO value of 0, the second transmission opportunity has an RAO value of 1, and so on.

In another example, the DCI indicates three transmission opportunities, and order values of the transmission opportunities in chronological order are decreased by 1 in sequence (that is, in descending order). The last transmission opportunity has an RAO value of 0, the penultimate transmission opportunity has an RAO value of 1, and so on.

The preceding transmission opportunity may include a transmission opportunity for initial transmission and/or a transmission opportunity for retransmission, where the transmission opportunity for initial transmission includes one or more resources for initial transmission, and the one or more resources may be used for sending various physical channels or signals of sidelink communication. The transmission opportunity for retransmission includes one or more groups of transmission opportunities for retransmission, each group of transmission opportunities includes one or more resources for retransmission, and the one or more resources may be used for sending various physical channels or signals of sidelink communication.

Figure 11:
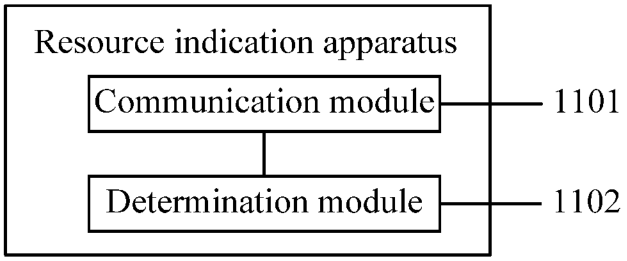
FIG. 11 is a structure diagram of a resource indication apparatus according to an embodiment of the present application.

FIG. 11 is a structure diagram of a resource indication apparatus according to an embodiment of the present application. The apparatus may be integrated into a first communication node. As shown in FIG. 11, the apparatus may include a communication module 1101 and a determination module 1102. The communication module 1101 is configured to receive resource usage information; where the resource usage information includes resource position information of at least one transmission opportunity and an RAO of the at least one transmission opportunity or a set of to-be-used resources. The determination module 1102 is configured to determine availability of a transmission opportunity according to the resource usage information.

For example, the determination module 1102 selects, from the at least one transmission opportunity, a transmission opportunity corresponding to the RAO and determines whether availability of the selected transmission opportunity is available or unavailable.

Alternatively, the determination module 1102 senses a channel, acquires a sensing result, and determines availability of a transmission opportunity in the set of to-be-used resources according to the sensing result.

For example, the preceding RAO includes at least one of the following:

All transmission opportunities have the same order, and one order value indicates all the transmission opportunities; a set of transmission opportunities for initial transmission and each set of transmission opportunities for retransmission correspond to their respective order values; different transmission opportunities correspond to their respective order values; order values of multiple transmission opportunities in chronological order are arranged in ascending order, where an initial value of the order values is 0 or an indication value X, and X is an integer greater than or equal to 0; order values of multiple transmission opportunities in chronological order are arranged in descending order, where an initial value of the order values is N or an indication value Y, and N and Y are each an integer greater than 0; or the smaller a value of the RAO, the higher a priority.

Alternatively, the RAO also includes one of the following:

In the case where an order value range of the RAO is less than 2, an order value of 0 indicates that the current transmission opportunity is available as long as the current transmission opportunity satisfies a channel usage condition, and an order value of 1 indicates that a condition for the current transmission opportunity to be available includes at least that the first communication node senses that another communication node releases a resource corresponding to the current transmission opportunity. In the case where an order value range of the RAO is greater than 1, an order value of 0 indicates that the current transmission opportunity is available as long as the current transmission opportunity satisfies a channel usage condition, and an order value of k indicates that a condition for the current transmission opportunity to be available includes at least that the first communication node senses that another communication node corresponding to an order value of k−1 releases a resource corresponding to the current transmission opportunity, where k is an integer greater than 0.

In an example, in the case where the sensing result satisfies a first condition, the determination module determines that the transmission opportunity is available; or in the case where the sensing result does not satisfy a first condition, the determination module determines that the transmission opportunity is unavailable.

For example, the first condition includes the following: if LBT of the determination module 1102 succeeds before any one transmission opportunity determined, the one transmission opportunity is available; or if the communication module 1101 transmits data before any one transmission opportunity determined, the transmission opportunity for transmitting the data is within the remaining COT, and a time interval between the one transmission opportunity determined and the transmission opportunity for transmitting the data is less than a threshold, the determination module 1102 determines that the one transmission opportunity is available; or the communication module 1101 senses COT information sent by another communication node before any one transmission opportunity determined, if the COT information satisfies a usage condition, the one transmission opportunity determined is adjacent to a transmission slot where the COT information is sensed, and a time interval between the one transmission opportunity determined and the transmission slot is less than a threshold, the determination module 1102 determines that the one transmission opportunity is available.

In an embodiment, the preceding usage condition includes that strength of a notification signal sent by the other communication node is greater than a strength threshold; or the usage condition includes that a channel priority is not lower than a channel priority indicated by the other communication node indicating the COT sharing; or the usage condition includes that strength of a notification signal sent by the other communication node is greater than a strength threshold and a channel priority is not lower than a channel priority indicated by the other communication node indicating the COT sharing.

In an example, in the case where the determination module 1102 determines that the transmission opportunity is unavailable, the communication module 1101 is further configured to send indication signaling indicating that the current transmission opportunity is unavailable.

The preceding transmission opportunity includes a transmission opportunity for initial transmission and/or a transmission opportunity for retransmission.

In an example, the communication module 1101 is further configured to send a sidelink communication signal on an available transmission opportunity.

The sidelink communication signal is used for indicating an SRO or an SAO of a resource corresponding to a transmission opportunity other than the available transmission opportunity in the resource usage information.

SCI in the sidelink communication signal may indicate the SRO or the SAO.

For example, the SCI indicates the SRO or the SAO in at least one of the manners below.

An indication is performed in an SAO field in the SCI. An indication is performed in an SRO field in the SCI. A resource selection mode is indicated, where the resource selection mode implicitly indicates the SAO or the SRO. An indication is performed through a 1-bit identifier bit. The SCI implicitly indicates that the SAO is 0 or that the SRO is 1. For example, if the RAO supports at most two order values, 0 and 1, the current SCI implicitly indicates that the SAO is 0 or that the SRO is 1. For example, the SCI indicates that some resource is a released resource or that the SAO corresponding to the resource is 0 or that the SRO corresponding to the resource is 1. An indication is performed based on a $2^{nd}$-stage SCI format.

For example, the SAO is determined according to the RAO in the resource usage information, where a value of the SAO is equal to the value of the RAO.

The SRO is determined according to the RAO in the resource usage information, where a value of the SRO is equal to the value of the RAO plus 1.

The SAO includes at least one of the following:

In the case where an order value range of the RAO is less than 2, for an order value of 0, the SAO corresponding to the transmission opportunity indicated in the SCI is 0, and for an order value of 1, the SAO corresponding to the transmission opportunity indicated in the SCI is 1. In the case where an order value range of the RAO is greater than 1, for an order value of 0, the SAO corresponding to the transmission opportunity indicated in the SCI is 0, and for an order value of k, the SAO corresponding to the transmission opportunity indicated in the SCI is k, where k is an integer greater than 0.

The SRO includes at least one of the following:

In the case where an order value range of the RAO is less than 2, for an order value of 0, the SRO corresponding to a transmission opportunity indicated in the SCI is 0, and for an order value of 1, the SRO corresponding to the transmission opportunity indicated in the SCI is 1. In the case where an order value range of the RAO is greater than 1, for an order value of 0, the SRO corresponding to the transmission opportunity indicated in the SCI is 0, and for an order value of k, the SRO corresponding to the transmission opportunity indicated in the SCI is k, where k is an integer greater than 0.

The resource indication apparatus provided in the embodiment is configured to implement the resource indication method in the embodiment shown in FIG. 1 and has similar implementation principles and technical effects. The details are not repeated here.

Figure 12:
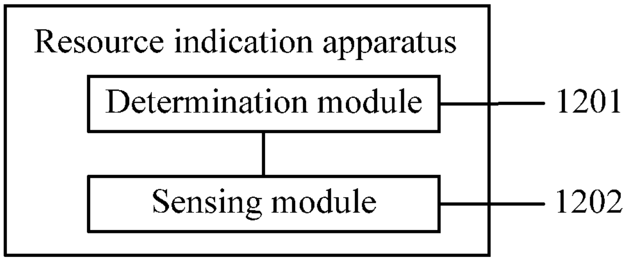
FIG. 12 is a structure diagram of another resource indication apparatus according to an embodiment of the present application.

FIG. 12 is a structure diagram of a resource indication apparatus according to an embodiment of the present application. The apparatus may be integrated into a second communication node. As shown in FIG. 12, the apparatus may include a determination module 1201 and a sensing module 1202. The determination module is configured to use at least one acquired resource as a transmission opportunity. The sensing module is configured to sense SCI sent by another communication node. The determination module is further configured to determine availability of the transmission opportunity according to the SCI.

For example, in the case where a second condition is satisfied, the determination module 1201 determines that the transmission opportunity is available. In the case where the second condition is not satisfied, the determination module 1201 determines that the transmission opportunity is unavailable.

The second condition includes at least one of the conditions below.

The resource indication apparatus satisfies a channel usage condition. An RAO corresponding to the transmission opportunity has the highest level. An RAO corresponding to the transmission opportunity has a level of k, and the sensing module succeeds in sensing that an SAO indicated in the SCI sent by the other communication node is k−1. An RAO corresponding to the transmission opportunity has a level of k, and the sensing module succeeds in sensing that an SRO indicated in the SCI sent by the other communication node is k.

In an example, the apparatus may also include a communication module. In the case where the determination module 1201 determines that the transmission opportunity is available, the communication module is configured to perform sidelink communication. In the case where the determination module 1201 determines that the transmission opportunity is unavailable, the communication module is configured to send indication information.

For example, the communication module is configured to implement at least one of the functions below.

Communication information of a physical channel or a physical signal is sent on a resource corresponding to the current transmission opportunity. It is determined that the first available resource is an initial transmission resource, and it is determined that another available resource is a retransmission resource.

SCI is sent on a resource corresponding to the current transmission opportunity to indicate an SRO or an SAO.

The SCI indicates the SRO or the SAO in at least one of the manners below.

An indication is performed in an SAO field in the SCI. An indication is performed in an SRO field in the SCI. A resource selection mode is indicated, where the resource selection mode implicitly indicates the SAO or the SRO. An indication is performed through a 1-bit identifier bit. The SCI implicitly indicates that the SAO is 0 or that the SRO is 1. For example, if the RAO supports at most two order values, 0 and 1, the current SCI implicitly indicates that the SAO is 0 or that the SRO is 1. For example, the SCI indicates that some resource is a released resource or that the SAO corresponding to the resource is 0 or that the SRO corresponding to the resource is 1. An indication is performed based on a $2^{nd}$-stage SCI format.

In an example, that the resource indication apparatus satisfies the channel usage condition includes the following:

BT of the resource indication apparatus succeeds before any one transmission opportunity determined. Alternatively, a transmission opportunity where the resource indication apparatus transmits data before any one transmission opportunity determined is within the remaining COT and a time interval between the one transmission opportunity determined and the transmission opportunity for transmitting the data is less than a threshold. Alternatively, the resource indication apparatus senses COT information sent by another communication node before any one transmission opportunity determined, if the COT information satisfies a usage condition, the one transmission opportunity determined is adjacent to a transmission slot where the COT information is sensed, and a time interval between the one transmission opportunity determined and the transmission slot is less than a threshold.

In an example, that the communication module sends the indication information includes at least one of the following:

Higher-layer signaling is sent, where the higher-layer signaling indicates that the current transmission opportunity is unavailable and triggers resource reselection. The current transmission opportunity is discarded, and higher-layer signaling is sent. The current transmission opportunity is discarded, and indication information is sent to a third communication node.

The resource indication apparatus provided in the embodiment is configured to implement the resource indication method in the embodiment shown in FIG. 9 and has similar implementation principles and technical effects. The details are not repeated here.

Figure 13:
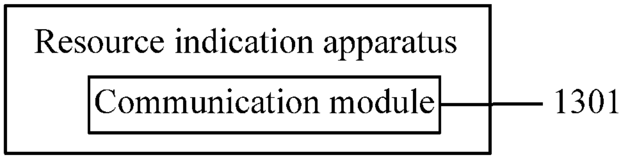
FIG. 13 is a structure diagram of another resource indication apparatus according to an embodiment of the present application.

FIG. 13 is a structure diagram of a resource indication apparatus according to an embodiment of the present application. The apparatus may be integrated into a third communication node. As shown in FIG. 13, the apparatus may include a communication module 1301. The communication module is configured to send resource usage information to a first communication node, where the resource usage information includes at least one transmission opportunity and an RAO and is used for instructing the first communication node to determine availability of a transmission opportunity of the at least one transmission opportunity.

For example, the preceding RAO includes at least one of the following:

All transmission opportunities have the same order, and one order value indicates all the transmission opportunities; a set of transmission opportunities for initial transmission and each set of transmission opportunities for retransmission correspond to their respective order values; different transmission opportunities correspond to their respective order values; order values of multiple transmission opportunities in chronological order are arranged in ascending order, where an initial value of the order values is 0 or an indication value X, and X is an integer greater than or equal to 0; or order values of multiple transmission opportunities in chronological order are arranged in descending order, where an initial value of the order values is N or an indication value Y, and N and Y are each an integer greater than 0.

In an example, the RAO includes one of the following:

In the case where an order value range of the RAO is less than 2, an order value of 0 indicates that the current transmission opportunity is available as long as the current transmission opportunity satisfies a channel usage condition, and an order value of 1 indicates that a condition for the current transmission opportunity to be available includes at least that the first communication node senses that another communication node releases a resource corresponding to the current transmission opportunity. In the case where an order value range of the RAO is greater than 1, an order value of 0 indicates that the current transmission opportunity is available as long as the current transmission opportunity satisfies a channel usage condition, and an order value of k indicates that a condition for the current transmission opportunity to be available includes at least that the first communication node senses that another communication node corresponding to an order value of k−1 releases a resource corresponding to the current transmission opportunity, where k is an integer greater than 0.

The resource indication apparatus provided in the embodiment is configured to implement the resource indication method in the embodiment shown in FIG. 10 and has similar implementation principles and technical effects. The details are not repeated here.

Figure 14:
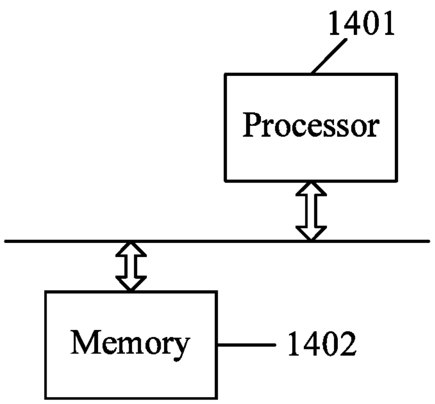
FIG. 14 is a structure diagram of a communication node according to an embodiment of the present application.

FIG. 14 is a structure diagram of a communication node according to an embodiment. As shown in FIG. 14, the node includes a processor 1401 and a memory 1402. One or more processors 1401 may be provided in the node, with one processor 1401 shown as an example in FIG. 14. The processor 1401 and the memory 1402 in the node may be connected via a bus or in other manners. The connection via a bus is shown as an example in FIG. 14.

As a computer-readable storage medium, the memory 1402 may be configured to store software programs, computer-executable programs and modules, such as program instructions/modules corresponding to the resource indication method in the embodiment of FIG. 1 in the present application (for example, modules in the resource indication apparatus according to any one of the embodiments of FIGS. 10 to 13). The processor 1401 executes the software programs, instructions and modules stored in the memory 1402 to implement the preceding resource indication method.

The memory 1402 may mainly include a program storage region and a data storage region. The program storage region may store an operating system and an application program required by at least one function. The data storage region may store data created according to the use of a communication node. Additionally, the memory 1402 may include a high-speed random-access memory and may also include a nonvolatile memory, such as at least one magnetic disk memory, a flash memory or another nonvolatile solid-state memory.

In an example, where possible, the processor in the preceding node may perform the preceding resource indication method through internal hardware circuits such as logic circuits and gate circuits.

Embodiments of the present application further provide a read-write storage medium for computer storage. The storage medium stores one or more programs executable by one or more processors to implement the resource indication method in the preceding embodiments.

It is to be understood by those of ordinary skill in the art that some or all steps of the preceding method and function modules/units in the preceding apparatus may be implemented as software, firmware, hardware and suitable combinations thereof.

In the hardware implementation, the division of the preceding function modules/units may not correspond to the division of physical components. For example, one physical component may have multiple functions, or one function or step may be performed jointly by multiple physical components. Some or all physical components may be implemented as software executed by a processor such as a central processing unit, a digital signal processor or a microprocessor, may be implemented as hardware, or may be implemented as integrated circuits such as application-specific integrated circuits. Such software may be distributed on computer-readable media. The computer-readable media may include computer storage media (or non-transitory media) and communication media (or transitory media). As is known to those of ordinary skill in the art, the term computer storage media include volatile and nonvolatile media as well as removable and non-removable media implemented in any method or technology for storing information (such as computer-readable instructions, data structures, program modules or other data). The computer storage media include, but are not limited to, a random-access memory (RAM), a read-only memory (ROM), an electrically erasable programmable read-only memory (EEPROM), a flash memory or other memory technologies, a compact disc read-only memory (CD-ROM), a digital versatile disc (DVD) or other optical disc storages, a magnetic cassette, a magnetic tape, a magnetic disk or other magnetic storage devices, or any other medium that can be used for storing desired information and that can be accessed by a computer. Additionally, as is known to those of ordinary skill in the art, the communication media generally include computer-readable instructions, data structures, program modules or other data in carriers or in modulated data signals transported in other transport mechanisms and may include any information delivery medium.

What is claimed is:

1. A resource indication method, comprising:

receiving, by a first communication node, resource usage information;

wherein the resource usage information comprises resource position information of at least one transmission opportunity and a resource assignment order (RAO) or a set of to-be-used resources; and determining, by the first communication node, availability of a transmission opportunity according to the resource usage information;

wherein determining, by the first communication node, the availability of the transmission opportunity according to the resource usage information comprises: selecting, by the first communication node and from the at least one transmission opportunity, a transmission opportunity corresponding to the RAO; and determining, by the first communication node, whether availability of the selected transmission opportunity is available or unavailable;

wherein the RAO comprises one of the following:

in response to an order value range of the RAO being less than 2, an order value of 0 of a resource corresponding to the transmission opportunity indicates that the transmission opportunity is available as long as the transmission opportunity satisfies a channel usage condition, and an order value of 1 of the resource corresponding to the transmission opportunity indicates that a condition for the transmission opportunity to be available comprises at least that the first communication node senses that another communication node releases the resource corresponding to the transmission opportunity; or in response to the order value range of the RAO being greater than 1, the order value of 0 of the resource corresponding to the transmission opportunity indicates that the transmission opportunity is available as long as the transmission opportunity satisfies the channel usage condition, and an order value of k of the resource corresponding to the transmission opportunity indicates that the condition for the transmission opportunity to be available comprises at least that the first communication node senses that another communication node corresponding to an order value of k−1 releases the resource corresponding to the transmission opportunity, wherein k is an integer greater than 0.

2. The method of claim 1, wherein determining, by the first communication node, the availability of the transmission opportunity according to the resource usage information comprises:

sensing, by the first communication node, a channel and acquiring a sensing result; and determining, by the first communication node, availability of a transmission opportunity in the set of to-be-used resources according to the sensing result.

3. The method of claim 1, wherein the RAO satisfies at least one of the following:

all transmission opportunities have a same order, and all the transmission opportunities are indicated based on one order value;

a set of transmission opportunities for initial transmission and each set of transmission opportunities for retransmission correspond to respective order values;

different transmission opportunities correspond to respective order values;

order values of a plurality of transmission opportunities in chronological order are arranged in ascending order, wherein an initial value of the order values is 0 or an indication value X, and X is an integer greater than or equal to 0;

the order values of the plurality of transmission opportunities in chronological order are arranged in descending order, wherein the initial value of the order values is N or an indication value Y, and N and Y are each an integer greater than 0; or the smaller an order value of the RAO, the higher a priority.

4. The method of claim 2, wherein determining, by the first communication node, the availability of the transmission opportunity in the set of to-be-used resources according to the sensing result comprises at least one of:

in response to the sensing result satisfying a first condition, determining, by the first communication node, that the transmission opportunity is available; or in response to the sensing result not satisfying the first condition, determining, by the first communication node, that the transmission opportunity is unavailable.

5. The method of claim 4, wherein the first condition comprises one of the following:

in response to Listen Before Talk (LBT) of the first communication node succeeding before one transmission opportunity determined, the one transmission opportunity is available;

in response to a transmission opportunity where the first communication node transmits data before the one transmission opportunity determined being within a remaining channel occupancy time (COT) and a time interval between the one transmission opportunity determined and the transmission opportunity where the first communication node transmits the data being less than a threshold, the one transmission opportunity is available; or in response to the first communication node sensing COT information sent by another communication node before the one transmission opportunity determined, the COT information satisfying a usage condition, the one transmission opportunity determined being adjacent to a transmission slot where the COT information is sensed, and a time interval between the one transmission opportunity determined and the transmission slot being less than a threshold, the one transmission opportunity is available;

wherein the usage condition satisfied by the COT information comprises that strength of a notification signal sent by the another communication node is greater than a strength threshold; or the usage condition satisfied by the COT information comprises that a channel priority is not lower than a channel priority indicated by the another communication node indicating COT sharing; or the usage condition satisfied by the COT information comprises that the strength of the notification signal sent by the another communication node is greater than the strength threshold and the channel priority is not lower than the channel priority indicated by the another communication node indicating COT sharing.

6. The method of claim 1, further comprising:

in response to the first communication node determining that the transmission opportunity is unavailable, sending, by the first communication node, indication signaling indicating that the transmission opportunity is unavailable.

7. The method of claim 1, wherein the transmission opportunity comprises at least one of a transmission opportunity for initial transmission or a transmission opportunity for retransmission.

8. The method of claim 1, further comprising:

sending, by the first communication node, a sidelink communication signal on an available transmission opportunity;

wherein the sidelink communication signal is used for indicating a sidelink release order (SRO) or a sidelink assignment order (SAO) of a resource corresponding to a transmission opportunity other than the available transmission opportunity in the resource usage information.

9. The method of claim 8, wherein sidelink control information (SCI) in the sidelink communication signal indicates the SRO or the SAO;

wherein the SCI indicates the SRO or the SAO in at least one of the following manners:

an indication in an SAO field in the SCI;

an indication in an SRO field in the SCI;

indicating a resource selection mode which implicitly indicates the SAO or the SRO;

an indication through a 1-bit identifier bit;

the SCI implicitly indicating that the SAO is 0 or that the SRO is 1; or an indication based on a $2^{nd}$-stage SCI format.

10. The method of claim 8, wherein the SAO is determined according to the RAO in the resource usage information; and the SRO is determined according to the RAO in the resource usage information.

11. The method of claim 9, wherein the SAO comprises at least one of the following:

in response to the order value range of the RAO being less than 2, for an order value of the RAO of 0, the SAO corresponding to the transmission opportunity indicated in the SCI is 0, and for an order value of the RAO of 1, the SAO corresponding to the transmission opportunity indicated in the SCI is 1; or in response to the order value range of the RAO being greater than 1, for the order value of the RAO of 0, the SAO corresponding to the transmission opportunity indicated in the SCI is 0, and for an order value of the RAO of k, the SAO corresponding to the transmission opportunity indicated in the SCI is k, wherein k is an integer greater than 0;

wherein the SRO comprises at least one of the following:

in response to the order value range of the RAO being less than 2, for the order value of the RAO of 0, the SRO corresponding to the transmission opportunity indicated in the SCI is 1, and for the order value of the RAO of 1, the SRO corresponding to the transmission opportunity indicated in the SCI is 2; or in response to the order value range of the RAO being greater than 1, for the order value of the RAO of 0, the SRO corresponding to the transmission opportunity indicated in the SCI is 1, and for the order value of the RAO of k, the SRO corresponding to the transmission opportunity indicated in the SCI is k+1, wherein k is an integer greater than 0.

12. A communication node, comprising a processor, wherein when executing a computer program, the processor performs the resource indication method of claim 1.

13. A non-transitory read-write storage medium, which is configured to store a computer program which, when executed by a processor, causes the processor to perform the resource indication method of claim 1.

14. A resource indication method, comprising:

using, by a second communication node, at least one acquired resource as a transmission opportunity;

sensing, by the second communication node, sidelink control information (SCI) sent by another communication node; and determining, by the second communication node, availability of the transmission opportunity according to the SCI;

wherein determining, by the second communication node, the availability of the transmission opportunity according to the SCI comprises at least one of:

in response to determining that a second condition is satisfied, determining, by the second communication node, that the transmission opportunity is available; or in response to determining that the second condition is not satisfied, determining, by the second communication node, that the transmission opportunity is unavailable;

wherein the second condition comprises at least one of the following:

a resource assignment order (RAO) corresponding to the transmission opportunity has a highest level;

the RAO corresponding to the transmission opportunity has a level of k, and the second communication node succeeds in sensing that a sidelink assignment order (SAO) indicated in the SCI sent by the another communication node is k−1; or the RAO corresponding to the transmission opportunity has the level of k, and the second communication node succeeds in sensing that a sidelink release order (SRO) indicated in the SCI sent by the another communication node is k.

15. The method of claim 14, wherein the second condition further comprises: the second communication node satisfies a channel usage condition, and wherein the second communication node satisfying the channel usage condition comprises one of the following:

Listen Before Talk (LBT) of the second communication node succeeds before one transmission opportunity determined;

a transmission opportunity where the second communication node transmits data before the one transmission opportunity determined is within a remaining channel occupancy time (COT) and a time interval between the one transmission opportunity determined and the transmission opportunity where the second communication node transmits the data is less than a threshold; or before the one transmission opportunity determined, the second communication node senses COT information sent by the another communication node, the COT information satisfies a usage condition, the one transmission opportunity determined is adjacent to a transmission slot where the COT information is sensed, and a time interval between the one transmission opportunity determined and the transmission slot is less than a threshold.

16. The method of claim 14, further comprising:

in response to the second communication node determining that the transmission opportunity is available, performing, by the second communication node, sidelink communication, wherein performing, by the second communication node, the sidelink communication comprises at least one of:

sending communication information of a physical channel or a physical signal on a resource corresponding to the transmission opportunity;

determining that a first available resource is an initial transmission resource, and determining that another available resource is a retransmission resource; or sending the SCI on the resource corresponding to the current transmission opportunity to indicate an SRO or an SAO, wherein the SCI indicates the SRO or the SAO in at least one of the following manners:

an indication in an SAO field in the SCI;

an indication in an SRO field in the SCI;

indicating a resource selection mode which implicitly indicates the SAO or the SRO;

an indication through a 1-bit identifier bit;

the SCI implicitly indicating that the SAO is 0 or that the SRO is 1; or an indication based on a $2^{nd}$-stage SCI format; or in response to the second communication node determining that the transmission opportunity is unavailable, sending, by the second communication node, indication information, wherein sending, by the second communication node, the indication information comprises at least one of:

sending higher-layer signaling, wherein the higher-layer signaling indicates that the transmission opportunity is unavailable and triggers resource reselection;

discarding the transmission opportunity and sending the higher-layer signaling; or discarding the transmission opportunity and sending the indication information to a third communication node.

17. A resource indication method, comprising:

sending, by a third communication node, resource usage information to a first communication node;

wherein the resource usage information comprises at least one transmission opportunity and a resource assignment order (RAO) and is used for instructing the first communication node to determine availability of a transmission opportunity of the at least one transmission opportunity;

wherein the RAO comprises one of the following:

in response to an order value range of the RAO being less than 2, an order value of 0 of a resource corresponding to the transmission opportunity indicates that the transmission opportunity is available as long as the transmission opportunity satisfies a channel usage condition, and an order value of 1 of the resource corresponding to the transmission opportunity indicates that a condition for the transmission opportunity to be available comprises at least that the first communication node senses that another communication node releases the resource corresponding to the transmission opportunity; or in response to the order value range of the RAO being greater than 1, the order value of 0 of the resource corresponding to the transmission opportunity indicates that the transmission opportunity is available as long as the transmission opportunity satisfies the channel usage condition, and an order value of k of the resource corresponding to the transmission opportunity indicates that the condition for the transmission opportunity to be available comprises at least that the first communication node senses that another communication node corresponding to an order value of k−1 releases the resource corresponding to the transmission opportunity, wherein k is an integer greater than 0.

18. The method of claim 17, wherein the RAO satisfies at least one of the following:

all transmission opportunities have a same order, and all the transmission opportunities are indicated based on one order value;

a set of transmission opportunities for initial transmission and each set of transmission opportunities for retransmission correspond to respective order values;

different transmission opportunities correspond to respective order values;

order values of a plurality of transmission opportunities in chronological order are arranged in ascending order, wherein an initial value of the order values is 0 or an indication value X, and X is an integer greater than or equal to 0; or the order values of the plurality of transmission opportunities in chronological order are arranged in descending order, wherein the initial value of the order values is N or an indication value Y, and N and Y are each an integer greater than 0.

* * * * *